United States Patent
Lambert et al.

(10) Patent No.: US 10,523,409 B2
(45) Date of Patent: Dec. 31, 2019

(54) METHOD OF SYNCHRONIZATION DURING THE PROCESSING, BY A MULTIMEDIA PLAYER, OF AN ITEM OF MULTIMEDIA CONTENT TRANSMITTED BY AN MBMS SERVICE

(71) Applicant: EXPWAY, Paris (FR)

(72) Inventors: David Lambert, Paris (FR); Romain Lahore-Carrate, Rosny sous Bois (FR); Jean Le Feuvre, Cachan (FR); Cédric Thienot, Paris (FR)

(73) Assignee: EXPWAY, Paris (FR)

( * ) Notice: Subject to any disclaimer, the term of this patent is extended or adjusted under 35 U.S.C. 154(b) by 71 days.

(21) Appl. No.: 14/907,766

(22) PCT Filed: Jul. 22, 2014

(86) PCT No.: PCT/FR2014/051886
§ 371 (c)(1),
(2) Date: Jan. 26, 2016

(87) PCT Pub. No.: WO2015/011398
PCT Pub. Date: Jan. 29, 2015

(65) Prior Publication Data
US 2016/0173268 A1 Jun. 16, 2016

(30) Foreign Application Priority Data
Jul. 24, 2013 (FR) .................. 13 57317

(51) Int. Cl.
*H04L 7/00* (2006.01)
*H04L 29/06* (2006.01)
(Continued)

(52) U.S. Cl.
CPC ........ *H04L 7/0016* (2013.01); *H04L 65/4076* (2013.01); *H04L 67/02* (2013.01);
(Continued)

(58) Field of Classification Search
CPC ............... H04L 7/0016; H04L 65/4076; H04L 65/4084; H04L 65/607; H04L 67/02
See application file for complete search history.

(56) References Cited

U.S. PATENT DOCUMENTS

| | | | |
|---|---|---|---|
| 9,438,883 B2* | 9/2016 | Oyman | H04L 65/4084 |
| 2013/0007223 A1* | 1/2013 | Luby | H04L 65/607 709/219 |
| 2013/0097287 A1* | 4/2013 | Shauh | H04L 65/4076 709/219 |

FOREIGN PATENT DOCUMENTS

WO 2013/033565 A1 3/2013

OTHER PUBLICATIONS

Sep. 30, 2014 Search Report issued in International Patent Application No. PCT/FR2014/051886.

* cited by examiner

Primary Examiner — Nam T Tran
(74) Attorney, Agent, or Firm — Oliff PLC

(57) ABSTRACT

A method for playing back an item of multimedia content by user devices, the method including steps of: receiving segments of an item of multimedia content by a server, storing the received segments in a buffer memory, transmitting a segment request from a multimedia player of a user device to the server, and transmitting, in response, a requested segment from the server to the multimedia player, if the segment is present in the buffer memory, transmitting a request for synchronization data from the multimedia player to the server, and transmitting, in response to the request, synchronization data from the server to the multimedia player, the data including an identifier of a last segment received, and a datum defining the time of receipt of the last segment by the user's device.

20 Claims, 2 Drawing Sheets

Figure 1:
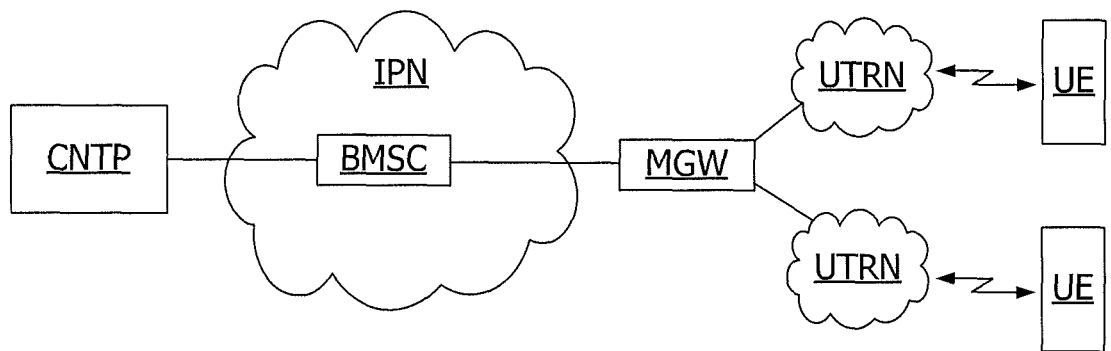

(51) Int. Cl.
*H04L 29/08* (2006.01)
*H04W 4/06* (2009.01)
(52) U.S. Cl.
CPC ............ *H04L 69/166* (2013.01); *H04W 4/06*
(2013.01); *H04L 65/4084* (2013.01)

METHOD OF SYNCHRONIZATION DURING THE PROCESSING, BY A MULTIMEDIA PLAYER, OF AN ITEM OF MULTIMEDIA CONTENT TRANSMITTED BY AN MBMS SERVICE

The present invention relates to the transmission of a data stream between a server and one or more user devices, through several different networks comprising a mobile network. The present invention applies in particular to the transmission of multimedia streams such as video and audio streams.

Packet or frame data transmission networks generally implement either communications in point-to-point mode (also referred to as "Unicast"), or communications in point-to-multipoint mode (also referred to as "Multicast"). Generally, a point-to-point communication is established between a single sender and a single receiver, while a point-to-multipoint communication is established between a single sender and several receivers. In a point-to-multipoint communication, the receivers connect up in a group session to receive a same data stream transmitted by a network infrastructure. The sender of the data stream does not have to know the identity of the receivers as it only sends one copy of the data stream, which is duplicated only when necessary to reach the different receivers of the group. The point-to-multipoint mode thus offers the advantage of loading networks less than the point-to-point mode, when a same stream is requested by several users.

The MBMS (Multimedia Broadcast Multicast Service) multimedia content broadcast or point-to-multipoint service was developed to distribute a same multimedia content in mobile networks to a large number of users. This service enables multimedia content requested by several users to be transmitted in broadcast or point-to-multipoint mode, for example in the format defined by the MPEG-DASH standard (Moving Picture Experts Group—Dynamic Adaptive Streaming over HTTP—Hypertext Transfer Protocol). This service is only effective in the cells of a mobile network in which several users have requested a same multimedia content.

The MPEG-DASH standard defines a structure enabling multimedia data to be organized into segments so that it can be played back without any jumps.

However, the smooth operation of a MPEG-DASH session requires a synchronization between the server providing the multimedia content and the user's device, in particular when the multimedia content is produced as and when it has to be broadcast (for example in the case of a live broadcast). Indeed, to determine a data segment to be played back at a given time, the user's device must estimate the time elapsed between the start of a period, available in absolute time, supplied by the server in a file describing the multimedia content, and the current time on the user device's side. If the estimate error is too high, the data segment requested by the user's device is no longer or not yet available, which generates an error.

Now, the MBMS service requires processing operations to be applied to the multimedia streams, said operations introducing variable latency times which can be relatively long. It is also frequent for the internal clocks of user devices not to be synchronized on the universal time (UTC). In addition, in the event of delayed play-back of an item of multimedia content previously stored, the play-back time associated with each segment for a live play-back does not correspond to the current time at which the multimedia content is played back. Synchronization problems also occur when a user device leaves a zone covered by a mobile network. The simple transmission of the absolute time of the server does not enable the user's device to be resynchronized as the latency times are not taken into account.

It is thus desirable to synchronize or resynchronize a user device with a server providing multimedia content, in particular by an MBMS service. It may also be desirable for user devices located in a same place to synchronously play back a same item of multimedia content, in particular when the segments of the multimedia content are relatively long.

Some embodiments relate to a method for playing back an item of multimedia content by user devices, the method comprising steps of: receiving segments of an item of multimedia content by a server, and storing the received segments in a buffer memory, and transmitting a segment request from a multimedia player of a user device to the server, transmitting, in response, a requested segment from the server to the multimedia player, if said segment is present in the buffer memory, transmitting a request for synchronization data from the multimedia player to the server, and transmitting, in response to the request, synchronization data from the server to the multimedia player, said data comprising an identifier of a last received segment, and a datum defining the time of receipt of the last segment by the user's device.

According to one embodiment, the synchronization data is transmitted in an HTTP response header or in a file.

According to one embodiment, multimedia content description data is received by the server or by the multimedia player.

According to one embodiment, the synchronization data comprises a datum relating to the number of segments susceptible of being saved in the buffer memory.

According to one embodiment, the datum defining the receipt time of the last segment is the current time of receipt of the last segment by the server, supplied by a clock of the user's device.

According to one embodiment, the datum defining the receipt time of the last segment is a time elapsed between the time the last segment is received by the server and the time the synchronization data is transmitted, the multimedia player saving the time at which the synchronization data is received and determining the time at which the start of the segment identified in the synchronization data is received based on the receipt time of the synchronization data and on the elapsed time contained in the synchronization data.

According to one embodiment, the request for synchronization data is sent following a synchronization error between a multimedia content server and the multimedia player.

According to one embodiment, the synchronization error occurs when a segment not available in the buffer memory is requested.

According to one embodiment, the request for synchronization data is sent before requesting a first segment of the multimedia content or after receiving the first segment.

According to one embodiment, the method comprises a step of determining, by the multimedia player, a segment identifier to be requested from the server and to be reproduced, according to a difference between the current time, the receipt time of the last segment and the duration of each segment.

According to one embodiment, the multimedia content is broadcast in accordance with the DASH-MPEG standard, via an MBMS service.

Some embodiments also relate to a multimedia content broadcasting system comprising a multimedia content server configured to send multimedia content in segments, and user devices configured to implement the method as defined above.

Some embodiments also relate to a user device comprising a server configured to implement the method as defined above.

Figure 2A:
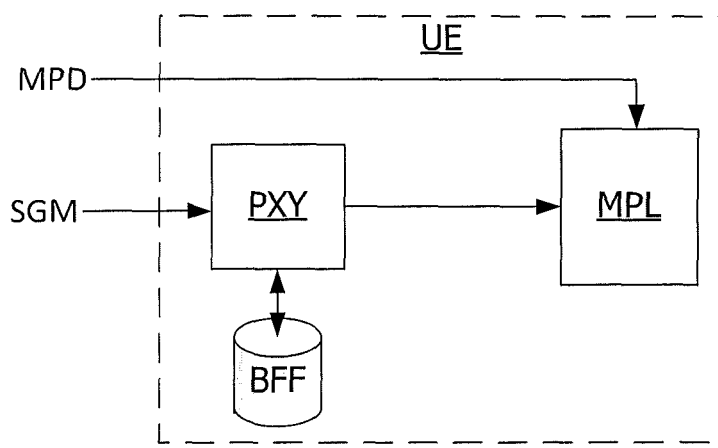
Figure 2B:
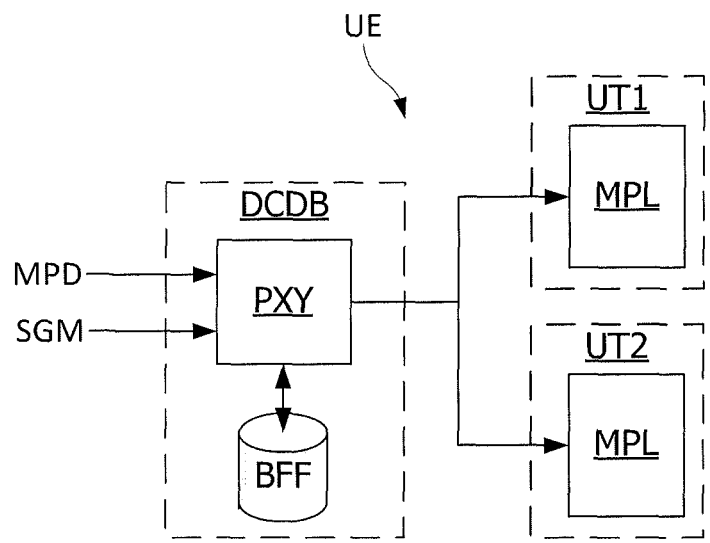
Figure 3:
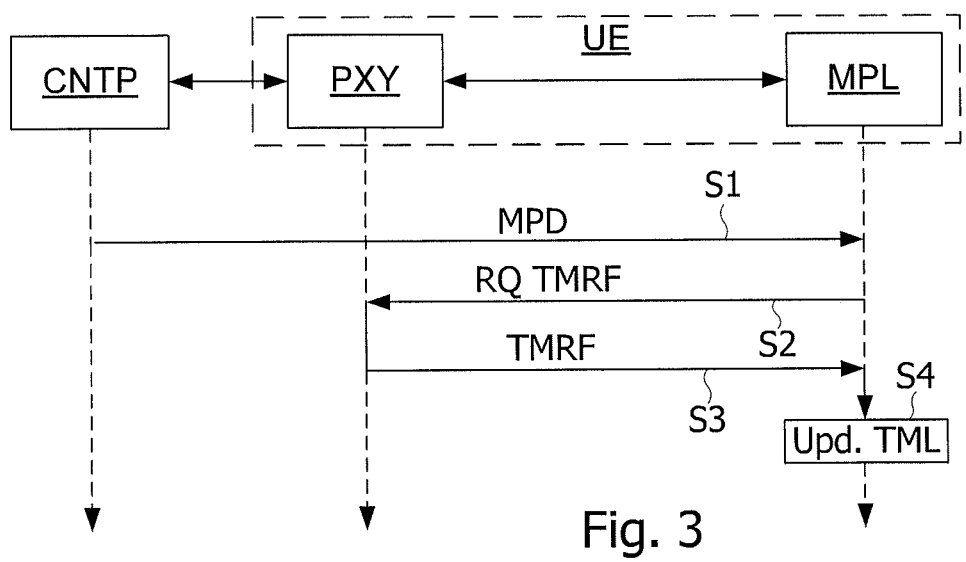
Figure 4:
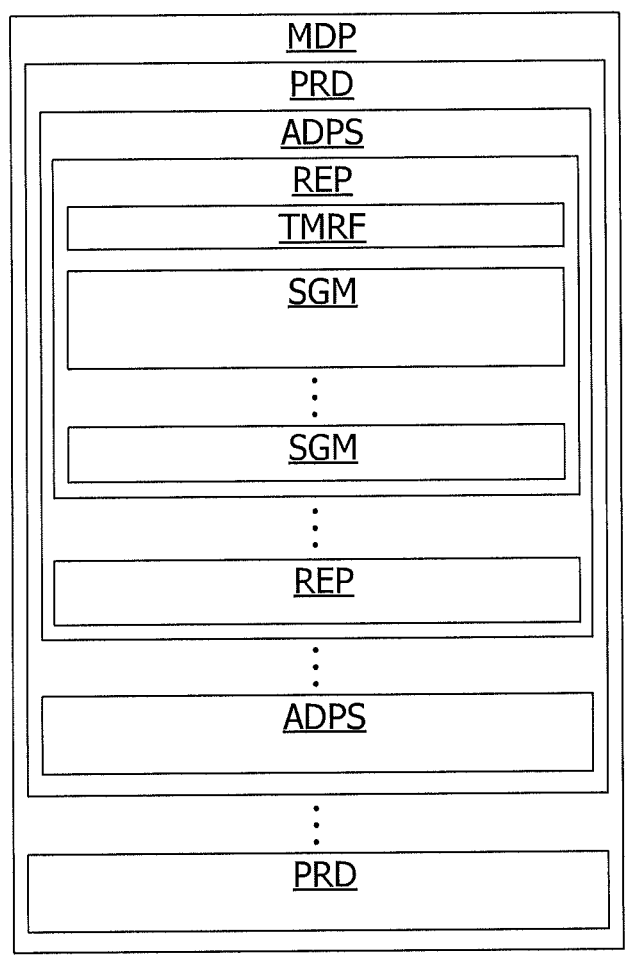

Some examples of embodiments of the present invention will be described below in relation with, but not limited to, the accompanying figures, in which:

FIG. 1 schematically represents a system for transmitting multimedia content between a content server and user devices, implementing an MBMP service, FIGS. 2A, 2B schematically represent a user device, FIG. 3 schematically represents steps of synchronization between a multimedia content server and a user device, according to one embodiment, FIG. 4 schematically represents a structure of data describing an item of multimedia content, according to one embodiment.

FIG. 1 represents a system implementing an MBMS (Multimedia Broadcast Multicast Service) multimedia content broadcast or point-to-multipoint transmission service. This service is described in the document 3GPP TS 26.346 V11.5.0 (2013). The system comprises one or more content servers CNTP, a network IPN such as the internet, a server BMSC implementing the MBMS service, linked to the server CNTP via the network IPN, a gateway MGW between the server BMSC and mobile networks UTRN, and user devices UE each connected to one of the mobile networks UTRN. The server CNTP transmits multimedia contents for example compliant with the MPEG-DASH standard, comprising segments associated with a descriptor MPD specifying the structure of the multimedia content.

FIG. 2A represents a user device UE. The device UE comprises a multimedia player MPL and a proxy server PXY connected to a buffer memory BFF. The device UE receives multimedia contents for example from the server CNTP, in the form of segments SGM and a descriptor MPD. The segments SGM are transmitted to the server PXY to be stored in the memory BFF and supplied on demand to the player MPL. The receipt time of the start of each segment is also written in the memory BFF in association with the content of the segment. The descriptor MPD is transmitted directly to the player MPL.

The device UE may be a mobile telephone such as a smart phone or a digital tablet, executing one or more applications implementing the server PXY and the player MPL.

FIG. 2B represents another type of user device UE comprising an internet set-top-box DCDB implementing the server PXY and the memory BFF, and one or more fixed or mobile terminals UT1, UT2 connected to the box DCDB via a link such as Ethernet or WiFi and executing an application is implementing a multimedia player MPL. The descriptor MPD may then be sent to the box DCDB to be distributed to the terminals UT1, UT2.

FIG. 3 represents steps S1 to S4 executed in particular by the device UE in order to synchronize with the server CNTP, according to one embodiment. In step S1, the player MPL of the device UE receives the descriptor MPD from the server CNTP. In step S2, the player MPL sends a synchronization request to the server PXY. In step S3, the server PXY responds to the synchronization request by sending an element TMRF containing synchronization data enabling the player MPL to synchronize with the server CNTP. Upon receiving the element TMRF, in step S4, the player MPL proceeds with a synchronization, consisting in calculating a difference between a time base of the server CNTP and a time base of the device UE, on the basis of the data transmitted in the element TMRF. When the server PXY and the player MPL are not implemented in a same device, the communications between them may be performed by any means.

Step S2 may be triggered when the server PXY cannot meet a segment request sent by the player MPL, either because the segment is no longer in the memory BFF, or because the segment has not yet been received and stored in the memory by the server PXY. Steps S2 to S4 enable the player MPL to determine which segments are saved in the memory BFF and when the receipt of the start of the last segment occurred.

FIG. 4 represents the structure of the descriptor MPD. In accordance with the DASH-MPEG standard, a descriptor MPD comprises one or more fields PRD each representing the structure of a period of an item of multimedia content, during which a set of encoded versions of an item of multimedia content is available. A period PRD comprises one or more adaptation sets ADPS. A set ADPS groups together encoded versions of one or more components of an item of multimedia content. For example, there may be a set ADPS for a main video component and a set ADPS for a main audio component. A set ADPS comprises several descriptors of representations REP. A representation describes an encoded version of one or more multimedia components. A representation may comprise several multimedia streams. A representation may be divided into segments, each associated with a URL address (Uniform Resource Locator). A segment is thus the largest multimedia data unit which can be obtained using a single HTTP request. The segments are associated with a duration corresponding to the reading time of the segment at a normal speed. Typically, all the segments of a same representation have the same duration which may change from one period PRD to the next or from one descriptor MPD to the next. The segments contain data defining a time line compared to a same time line shared by all the segments. Another time line enables the availability of a segment at a multimedia player to be determined. Before requesting a segment of a live broadcast, the multimedia player compares the current time with the availability time of the segment. Further details on the MPD structure can be obtained in the document ISO/IEC 23009-1:2012(E).

According to one embodiment, each of the representations REP or periods PRD of a descriptor MPD comprises a field (@xlink:href in XML language—Extended Mark-Up Language) provided to receive a link to an element TMRF containing synchronization data. The element TMRF transmitted by the server PXY may comprise the information contained in Table 1 below:

TABLE 1

| Element or attribute name | Description |
| --- | --- |
| TMRF | Description of the element TMRF |
| @availableSegmentName | specifies the name of the last segment available for this representation, at the time of reading the descriptor MPD if no link xlink:href is used, otherwise, at the time of resolving the link xlink:href. |
| @elapsedTime | specifies the time elapsed in seconds since the availabilityStartTime time of the segment identified by availableSegmentName. The default value is '0'. |
| @timeShiftSegments | specifies the number of segments available for a delayed reading, excluding the segment identified by |

TABLE 1-continued

| Element or attribute name | Description |
| --- | --- |
| @timeShiftBuffer | availableSegmentName.<br>If not specified, the value of timeShiftBuffer applies to this representation.<br>specifies the reading time of the buffer memory for the delayed reading for this representation, guaranteed available for a live broadcast.<br>If not specified, the value of timeShiftSegment applies to this representation. |

Only the attribute @availableSegmentName is compulsory.

The element TMRF thus enables the player MPL to have the name of the segment at the end of loading (@availableSegmentName) in the memory BFF. From the attribute @elapsedTime and the duration of a segment specified in the descriptor MPD, the player MPL may determine when the segment @availableSegmentName and the next segments will be available in the memory BFF. Thus, the segment @availableSegmentName is available at the time:

$$T(TMRF)-TMRF@elapsedTime \quad (1)$$

where T(TMRF) is the receipt time of the element TMRF.

The Nth next segment is available at the time $$T(TMRF)-TMRF@elapsedTime+SGMD \times N \quad (2)$$

where SGMD is the duration of a segment, as specified in the descriptor MPD.

The player MPL may also determine the number N of segments supposed to be received at a time T since the receipt of the element TMRF, by the following formula:

$$N=\text{Floor}[(T-T(TMRF)+TMRF@elapsedTime)/SGMD] \quad (3)$$

where Floor(x) is a function giving the whole part of the number x.

As the names of the segments are generally numbered, the player MPL may determine the names of the segments available in the memory BFF, from the number of segments available in the memory BFF (from @availableSegmentName or @timeShiftBuffer and from the duration of a segment specified in the descriptor MPD).

The server PXY may transmit the element TMRF by inserting it into the descriptor MPD instead of the link @xlink:href, if it knows the structure of the descriptor MPD. In this case, the server PXY receives the descriptor MPD and sends it to the player MPL.

It will be understood by those skilled in the art that the present invention is susceptible of various alternative embodiments and various applications. In particular, the invention is not limited to the content of the element TMRF as defined in Table 1. Indeed, the attribute @elapsedTime may be replaced with an absolute time read on a clock of the user's device. The attributes @timeShiftSegments and @timeShiftBuffer may also be omitted, given that these attributes serve to determine by how many segments a multimedia player can go back, when playing back an item of multimedia content, rather than to synchronize the user's device.

The present invention does not apply solely to an MBMS service either. It may also apply to a point-to-point-type transmission (unicast) between a multimedia content server and a user device comprising an internet set-top-box. The multimedia data may be transmitted in accordance with the HTTP Live Streaming standard.

The operations performed by the proxy server PXY may also be performed by a remote server, for example the server CNTP, which has saved an item of multimedia content for delayed broadcast, without modifying the time line of the segments of the multimedia content, i.e. the play-back times of each segment.

The synchronization requests may be sent by the multimedia player at any time, before requesting a first segment of multimedia content, after receiving the first segment or upon each segment.

The invention claimed is:

1. A method for playing back an item of multimedia content by a user device, the method comprising:
   receiving, by a proxy server of a user device from a content server, segments of an item of multimedia content, and storing the received segments in a buffer memory of the user device,
   receiving, by the proxy server, a segment request from a multimedia player of the user device, and transmitting, by the proxy server to the multimedia player, a requested segment corresponding to the segment request, if the requested segment is present in the buffer memory,
   receiving, by the proxy server from the multimedia player, a request for synchronization data,
   transmitting, by the proxy server to the multimedia player, synchronization data corresponding to the request for synchronization data, the synchronization data comprising an identifier of a last received segment, and a time elapsed between the time the last segment is received by the proxy server and the time the synchronization data is transmitted,
   saving, by the multimedia player, a time at which the synchronization data is received,
   determining a time at which a start of the segment identified in the synchronization data is received based on the receipt time of the synchronization data by the multimedia player and on the elapsed time, and
   computing, by the multimedia player, a difference between a time base of the content server and a time base of the user device, on the basis of receipt time of the start of the segment identified in the the synchronization data.

2. The method according to claim 1, wherein the synchronization data is transmitted in an HTTP response header or in a file.

3. The method according to claim 1, wherein multimedia content description data is received by the proxy server or by the multimedia player.

4. The method according to claim 1, wherein the synchronization data comprises a datum relating to the number of segments susceptible of being saved in the buffer memory.

5. The method according to claim 1, wherein the request for synchronization data is sent following a synchronization error between a multimedia content server and the multimedia player.

6. The method according to claim 5, wherein the synchronization error occurs when a segment not available in the buffer memory is requested.

7. The method according to claim 1, wherein the request for synchronization data is sent before requesting a first segment of the multimedia content or after receiving the first segment.

8. The method according to claim 1, comprising determining, by the multimedia player, a segment identifier to be requested from the proxy server and to be reproduced, according to a difference between the current time, the receipt time of the last segment and the duration of each segment.

9. The method according to claim 1, wherein the multimedia content is broadcast in accordance with the DASH-MPEG standard, via an MBMS service.

10. A multimedia content broadcasting system comprising a multimedia content server configured to send multimedia content in segments, and user devices, a first user device comprising a local proxy server configured to:
receive segments of an item of multimedia content from the content server, and storing the received segments in a buffer memory of the first user device,
receive a segment request from a multimedia player of the first user device, and transmit a segment corresponding to the segment request to the multimedia player of the first user device, if the segment is present in the buffer memory of the first user device,
receive a request for synchronization data from the multimedia player of the first user device, and
transmit synchronization data corresponding to the request for synchronization data to the multimedia player of the first user device, the synchronization data comprising an identifier of a last received segment, and a time elapsed between the time the last segment is received by the local proxy server and the time the synchronization data is transmitted, the synchronization data being used by the multimedia player to compute a difference between a time base of the multimedia content server and a time base of the user device, on the basis of a time at which a start of the segment identified in the synchronization data is received, determined from a receipt time of the synchronization data by the multimedia player and the elapsed time.

11. A device comprising a proxy server, a multimedia player and a buffer memory, the proxy server being configured to:
receive segments of an item of multimedia content, and storing the received segments in the buffer memory,
receive a segment request from the multimedia player, and transmit a segment corresponding to the segment request to the multimedia player, if the segment is present in the buffer memory,
receive a request for synchronization data from the multimedia player, and
transmit synchronization data corresponding to the request for synchronization data to the multimedia player, the synchronization data comprising an identifier of a last received segment, and a time elapsed between the time the last segment is received by the proxy server and the time the synchronization data is transmitted, the multimedia player being configured to:
save a first time at which the synchronization data is received;
determine a second time at which a start of the segment identified in the synchronization data is received based on the receipt time of the synchronization data by the multimedia player and on the elapsed time; and
compute a difference between a time base of the user device and a time base of a content server providing the item of multimedia content, on the basis of the first time and the second time.

12. The device according to claim 11, wherein the synchronization data is transmitted in an HTTP response header or in a file.

13. The device according to claim 11, wherein multimedia content description data is received by the proxy server or by the multimedia player.

14. The device according to claim 11, wherein the synchronization data comprises a datum relating to the number of segments susceptible of being saved in the buffer memory.

15. The device according to claim 11, wherein the request for synchronization data is sent following a synchronization error between the multimedia content server and the multimedia player.

16. The device according to claim 15, wherein the synchronization error occurs when a segment not available in the buffer memory is requested.

17. The device according to claim 11, wherein the request for synchronization data is sent before requesting a first segment of the multimedia content or after receiving the first segment.

18. The device according to claim 11, wherein the multimedia player is further configured to determine a segment identifier to be requested from the proxy server and to be reproduced, according to a difference between the current time, the receipt time of the last segment and the duration of each segment.

19. The device according to claim 11, wherein the multimedia content is broadcast in accordance with the DASH-MPEG standard, via an MBMS service.

20. A method for playing back an item of multimedia content by a user device, the method comprising:
transmitting, by a multimedia player of the user device to a proxy server of the user device, a segment request,
receiving, by the multimedia player from the proxy server, a segment corresponding to the segment request, if the segment is present in a buffer memory of the user device,
transmitting, by the multimedia player to the proxy server, a request for synchronization data,
receiving, by the multimedia player from the proxy server, synchronization data corresponding to the request for synchronization data, the synchronization data comprising an identifier of a last received segment, and a time elapsed between the time the last segment is received by the proxy server and the time the synchronization data is transmitted,
saving, by the multimedia player, a time at which the synchronization data is received,
determining a time at which a start of the segment identified in the synchronization data is received based on the receipt time of the synchronization data by the multimedia player and on the elapsed time, and
computing, by the multimedia player, a difference between a time base of the user device and a time base of a content server providing the item of multimedia content, on the basis of the receipt time of the start of the segment identified in the synchronization data.

* * * * *